US008868922B2

(12) United States Patent
Marshall et al.

(10) Patent No.: US 8,868,922 B2
(45) Date of Patent: Oct. 21, 2014

(54) WIRELESS AUTHORIZATION MECHANISM FOR MOBILE DEVICES AND DATA THEREON

(75) Inventors: Andrew Marshall, Dallas, TX (US); Tito Gelsomini, Plano, TX (US); Harvey Davis, Trenton, TX (US)

(73) Assignee: Texas Instruments Incorporated, Dallas, TX (US)

( * ) Notice: Subject to any disclaimer, the term of this patent is extended or adjusted under 35 U.S.C. 154(b) by 2391 days.

(21) Appl. No.: 11/616,619

(22) Filed: Dec. 27, 2006

(65) Prior Publication Data

US 2008/0162942 A1 Jul. 3, 2008

(51) Int. Cl.
*G06F 21/00* (2013.01)
*G07C 9/00* (2006.01)

(52) U.S. Cl.
CPC .. *G07C 9/00309* (2013.01); *G07C 2009/00412* (2013.01); *G07C 2009/00793* (2013.01); *G07C 2009/00388* (2013.01)
USPC .......................................................... 713/185

(58) Field of Classification Search
USPC .......................................................... 713/185
See application file for complete search history.

(56) References Cited

U.S. PATENT DOCUMENTS 5,131,038 A * 7/1992 Puhl et al. .................... 340/5.61
5,612,683 A * 3/1997 Trempala et al. ............ 340/5.23
6,353,889 B1 * 3/2002 Hollingshead ................ 713/169
2004/0124966 A1 * 7/2004 Forrest ........................... 340/5.8
2005/0071646 A1 * 3/2005 Hollingshead ................ 713/186
2006/0103535 A1 * 5/2006 Pahlaven et al. ........... 340/572.1
2007/0232241 A1 * 10/2007 Carley et al. .................... 455/83

* cited by examiner

*Primary Examiner* — Teshome Hailu
(74) *Attorney, Agent, or Firm* — Ronald O. Neerines; Frederick J. Telecky, Jr.

(57) ABSTRACT

In a bi-directional embodiment, an authorization transponder 114 coupled to the mobile device 128 transmits an interrogating message, which includes a UID 116 associated with the mobile device, to a nearby wireless key 100. The wireless key compares this received UID 116 with the one or more UID's 102 stored on the wireless key, and if a match is detected, sends the wireless key's UID or encrypted variant thereof to the interrogating authorization transponder 114. On receiving the UID from the wireless key 100 and determining that it matches the authorization transponder UID 116, a command is sent from authorization transponder 114 to mobile device 128 enabling some or all operations of mobile device 128. In a uni-directional embodiment, one or more UID 102 are periodically transmitted from a wireless key 200 to a receiver 122 in authorization receiver 202 coupled to the mobile device 128 to be controlled, wherein the UID 102 from the wireless key 200 is compared to a UID 116 associated with the authorization receiver 202. On receiving the one or more UID 102 from the wireless key 200 and determining that it matches the authorization receiver UID 116, a command is sent from authorization receiver 202 to mobile device 128 enabling some or all operations of mobile device 128. Yet another embodiment of the invention controls access to data on a passive mobile device, such as that data stored on the magnetic stripe of a transaction card 306, by authorizing the card reader 304 to read additional card data when the UID on the card matches a UID of a nearby wireless key. Upon reading a UID from the card, the card reader interrogates a wireless key for its UID, and compares these two UID's. If the two UID's match, authorization for further data transfer from and to the card is given.

21 Claims, 5 Drawing Sheets

WIRELESS AUTHORIZATION MECHANISM FOR MOBILE DEVICES AND DATA THEREON

BACKGROUND OF THE INVENTION

1. Field of the Invention

This invention relates generally to wireless security, and, in particular, to controlling usage of mobile devices and data thereon using short-range wireless authorization systems and methods.

2. Description of the Related Art

As advances in electronics enable ever-smaller and lighter mobile devices such as laptop and pocket computers, PDA's, smart-cards, and cell phones, and as these devices increasingly store sensitive data, the need to secure such devices and the data they hold is becoming increasingly important.

A commonly used approach to securing such data is the use of a password which must be entered before the device may be used, or before certain data may be accessed. Requiring password access is a deterrent to theft of the device and the data on the device, as long as the person contemplating theft of the device knows it will be useless to him without the activating password. The negative implications of password usage include the need to periodically change passwords, and the need to remember what may be a sizable number of passwords for multiple devices.

SUMMARY OF THE INVENTION

The invention provides a system and method for securing devices and data on such devices by allowing device operation or data access when the device is in proximity to a wireless key, carried by the authorized device user, and when unique or pseudo-unique identification codes on the key and the device match. A wireless key, in the context of this document, may be active or passive, bidirectional or unidirectional.

In an embodiment of the invention described in greater detail below, a passive wireless key such as an RFID tag with unique identification (UID) is carried by the authorized user, for example on a bracelet. A transponder coupled to the mobile device to be protected transmits an interrogating message to this wireless key, which sends the key's UID or encrypted variant thereof to the interrogating mobile device. If the received UID from the wireless key matches an authorized UID previously associated with the mobile device to be secured, device operation is allowed, otherwise it is not. If operation of the mobile device is attempted outside the range of the wireless key, or in the presence of a wireless key having the wrong UID, the device will prohibit some or all operations.

Another embodiment of the invention, also described in greater detail below, utilizes one-way transmission of an authorizing ID, typically from an active wireless key to a receiver in the mobile device to be secured.

Still another embodiment of the invention controls access to data on a mobile device such as that data stored on the magnetic stripe of a transaction card, without the need for a transponder or receiver on the mobile device, by authorizing the card reader for the transaction if a UID on the card matches a UID of a nearby wireless key. Upon reading a UID from the card, the card reader interrogates a wireless key for its UID, and compares these two UID's. If the two UID's match, authorization for further data transfer from and to the card is given.

As further described below, the disclosed embodiments provide a combination of desirable properties not available in the known art, including a means of securing devices or data thereon without the need for password control.

Further benefits and advantages will become apparent to those skilled in the art to which the invention relates.

BRIEF DESCRIPTION OF THE DRAWINGS

Example embodiments of the invention are described with reference to the accompanying drawings, wherein.

Throughout the drawings, like elements are referred to by like numerals.

DETAILED DESCRIPTION

Figure 1:
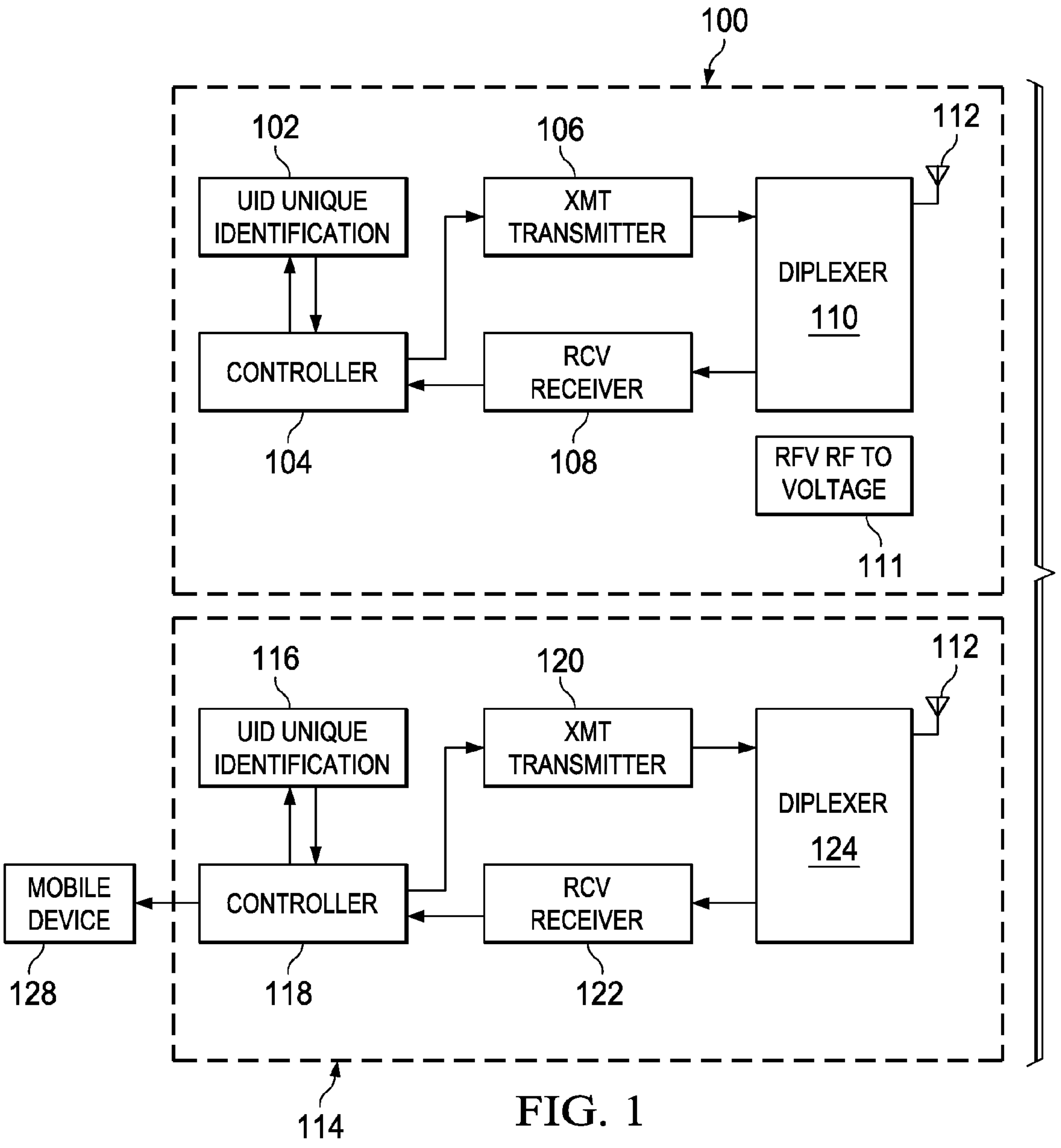
FIG. 1 shows a block diagram of a bi-directional system for securing a mobile device and data thereon, utilizing an active transponder in the mobile device to be protected and a passive wireless key in the possession of an authorized user.

In FIG. 1, wireless key 100 comprises unique identification (UID) 102, controller 104, transmitter (XMT) 106, receiver (RCV) 108, diplexer 110, RF to voltage converter (RFV) 111, and antenna 112. The topology described in FIG. 1 is typically appropriate when wireless key 100 is a passive transponder such as an RFID tag. Unique identification (UID) 102, typically stored in non-volatile memory, is a unique or pseudo-unique identifying data string, typically a multi-bit number or multi-character alpha string. A pseudo-unique ID is one which is unique within a very large but non-infinite range. Because the range is very large, the chance of unauthorized access by systematically trying various ID's is acceptably low. Controller 104 decodes data from receiver 108, formats data to be transmitted by transmitter 106, periodically or occasionally causes transmission from transmitter 106, and compares a received UID with the stored UID 102. Transmitter 106 generates a signal modulated by or otherwise carrying the UID 102, which signal is coupled through diplexer 110 to antenna 112. Signals from external sources impinging on antenna 112 are coupled through diplexer 110 to receiver 108, which amplifies and demodulates data contained on the received signal. The receiver data output is coupled to controller 104, such that demodulated data including received UID's may be compared with the UID 102 of wireless key 100. RF to voltage converter (RFV) 111 has its input coupled to the antenna, and rectifies or otherwise processes radio frequency energy from the antenna to convert this energy to a voltage suitable for powering the active elements of wireless key 100.

Authorization transponder (AT) 114 operates in a manner analogous to that of wireless key 100, but is coupled to the mobile device 128. In the preferred embodiment wherein wireless key 100 is a passive device, authorization transponder 114 is an active device with relatively high transmit power, to provide a receive signal strength at wireless key 100 high enough to generate suitable operating voltage in RFV 111. In this preferred embodiment, controller 118 periodically or occasionally commands transmitter 120 to transmit a signal of such strength and duration as to activate wireless key 100. Data transmitted at this time may include but is not limited to UID 116 and appropriate messages such as type of mobile device 128. If wireless key 100 is within range of authorization transponder 114, the UID 116 from authorization transponder 114 is received and coupled to controller 104 in wireless key 100. Also coupled to controller 104 is the UID 102. Controller 104 compares UID 102 and UID 116, and if they match, UID 102 is sent from wireless key 100 to authorization transponder 114. In authorization transponder 114, the received UID 102 is compared with UID 116, and if they match controller 118 sends an authorization command to mobile device 128.

Alternative embodiments of transmitter 106, transmitter 120, receiver 108, and receiver 122 may use energy other than radio frequency energy, such as infra-red or ultrasonic, to convey information. Diplexer 110 in such cases may be omitted, the energy from transmitter 106 for example being coupled to an infra-red or ultra-sonic emitter. Wireless key 100 may be an active device, typically having a battery for power, rather than a passive device. Yet other variations will be obvious to those skilled in the art.

Figure 2:
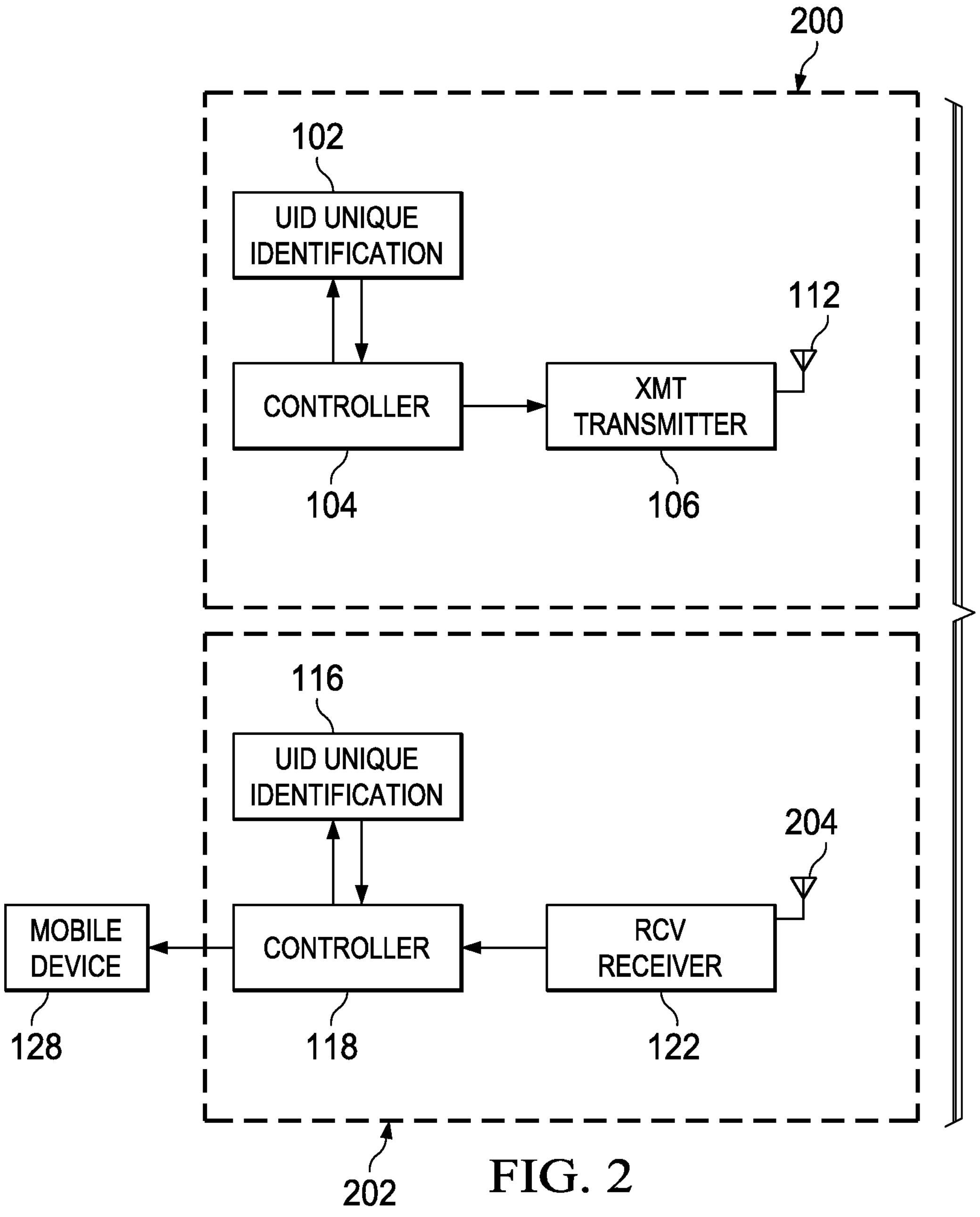
FIG. 2 shows a block diagram of a unidirectional system for securing a device and data thereon, utilizing a wireless key which is a transmitter in the possession of an authorized user, and a receiver in the mobile device to be protected.

In FIG. 2, an alternative embodiment has wireless key 200 comprising UID 102, controller 104, transmitter 106, and antenna 112. In this embodiment, wireless key 200 is actively powered by a battery or other suitable energy source. Controller 104 periodically or occasionally causes transmitter 106 coupled to antenna 112 to transmit the unique identification UID 102. Authorization receiver 202, which is coupled to mobile device 128, comprises antenna 204, receiver 122, controller 118, and UID 116. If wireless key 200 and authorization receiver 202 are close enough to allow data communication, a UID 102 transmitted by wireless key 200 is received by receiver 122. The UID 102 is then compared in controller 118 to UID 116, and if they match an authorization command is sent from controller 118 to mobile device 128.

In the embodiments described above, the UID 102 and UID 116 may be input or modified by various known and secure methods. Also using known methods sometimes referred to as rolling codes, these unique identifications may occasionally change in a manner such that once synchronized, codes in the wireless key and authorization transponder or receiver remain synchronized even as the identifications are changed.

Figure 3:
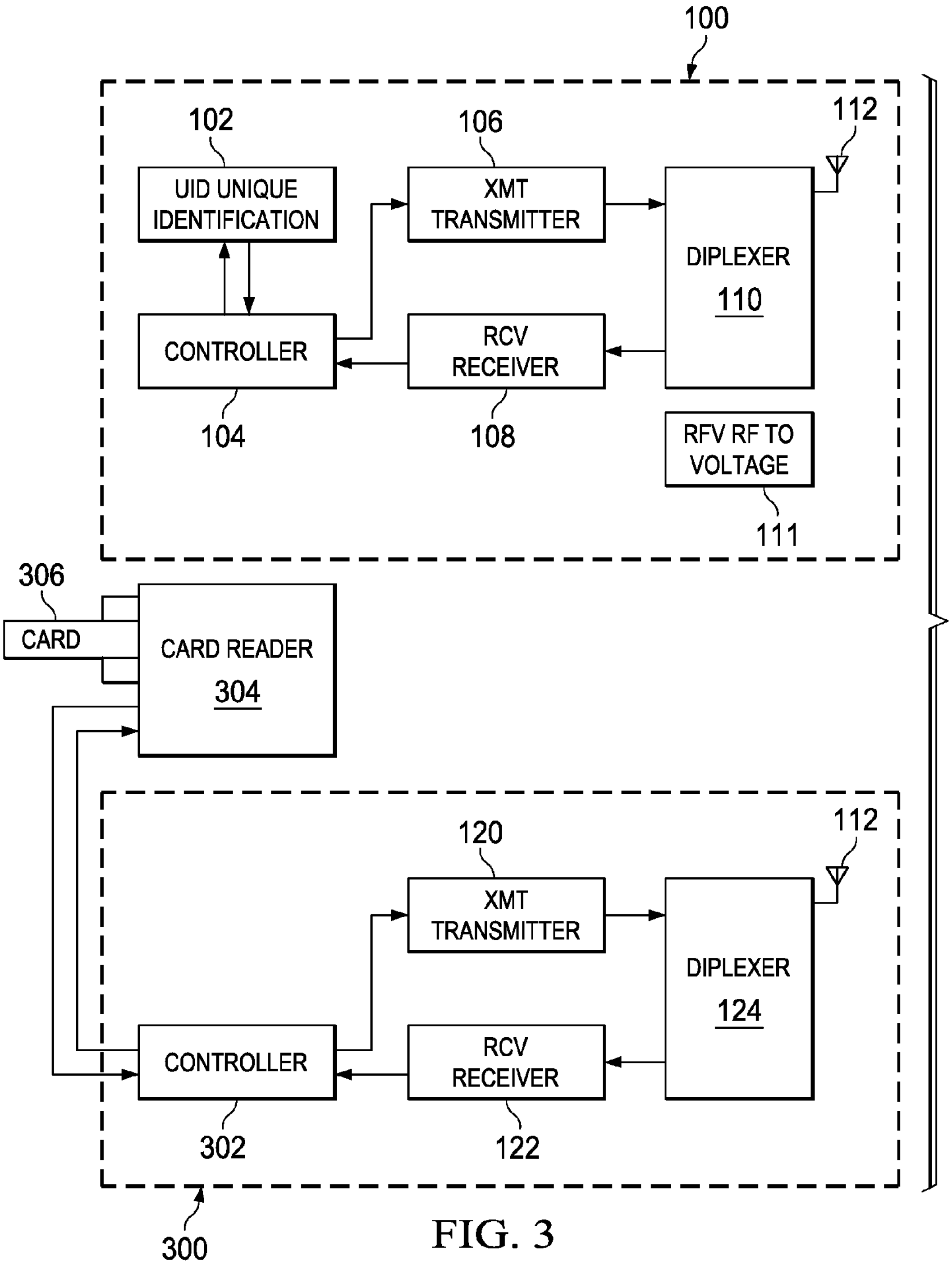
FIG. 3 is a block diagram of a system having a card reader communicating with the wireless key to determine authorization for card usage.

As shown in FIG. 3, yet another embodiment may secure a device which has no authorization transponder or receiver, such as a card 306 with magnetic stripe or other data storage mechanism. When card 306 is inserted into card reader 304, a UID contained on its magnetic stripe is transferred to card reader 304. This UID is coupled to controller 302, and in a manner as described for the topology of FIG. 1, the UID from the card is transmitted to wireless key 100, which compares the received UID to the UID 102. If they match, UID 102 is then sent from wireless key 100 to authorization transponder 300 and compared in controller 302. If the received UID 102 matches the UID from the card, an authorizing command is sent from controller 302 to card reader 304, allowing it to proceed with the transaction.

In all of the above-described embodiments, multiple UID's may be stored on the wireless key, facilitating a single wireless key authorizing usage of multiple mobile devices. In the passive wireless key embodiment described in FIG. 1, UID 102 may be a set of numbers. When UID 116 is received, it is compared to typically all UID 102 numbers, to determine if any match. If a match is found, the mobile device is enabled as described above. In the active key embodiment as described in FIG. 2, typically the entire set of UID 102 is transmitted to the authorization transponder of the mobile device. If any are found to match the device is enabled as described above.

Figure 4:
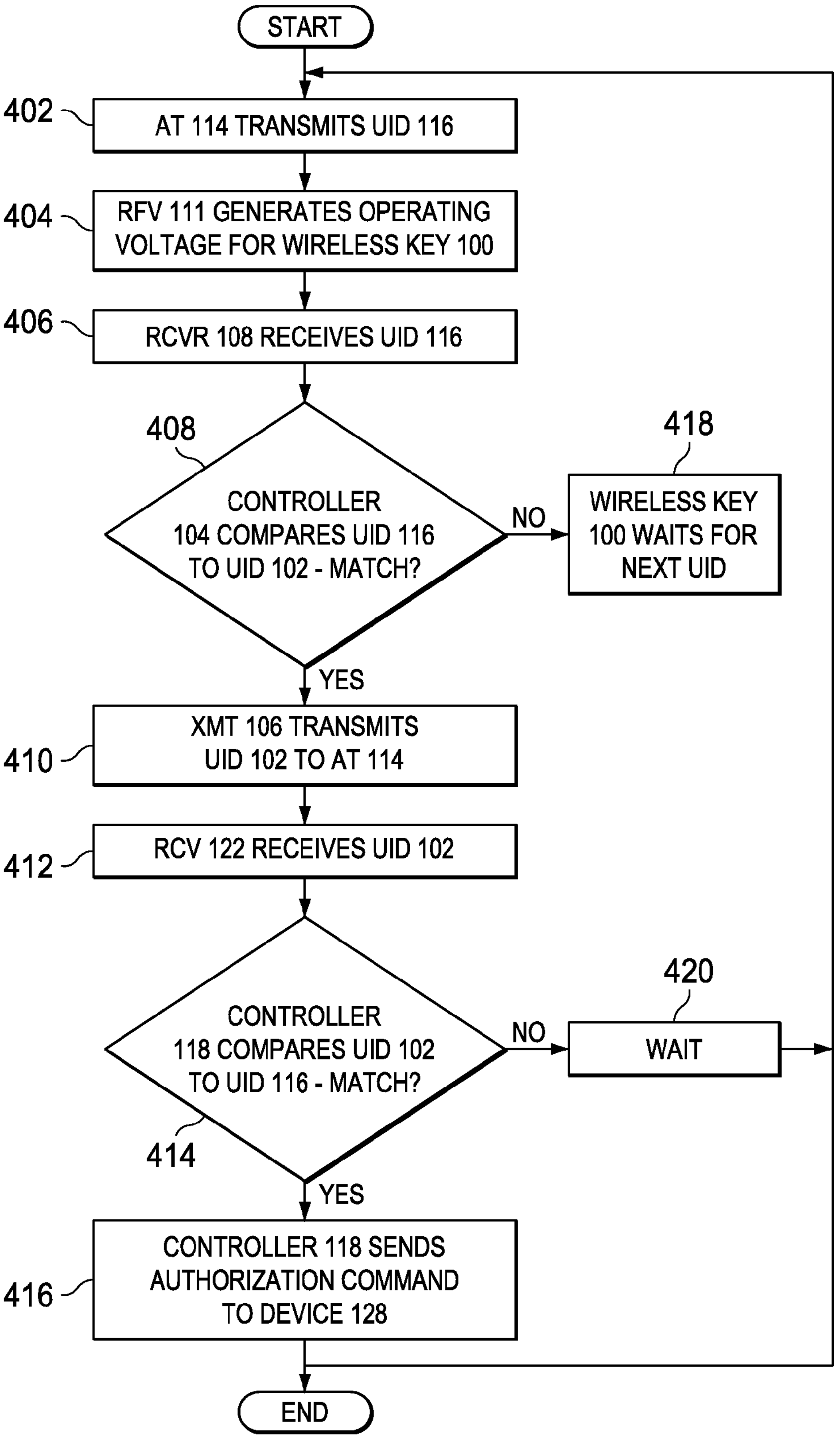
FIG. 4 is a flow diagram showing the method of operation of the system of FIG. 1.

In FIG. 4, a flow diagram illustrates operation of the system of FIG. 1. In this system, an active transponder in the mobile device to be controlled interrogates a passive wireless key. Operation starts at 402 when authorization transponder 114 transmits the UID associated with the mobile device. The radio frequency energy from this transmission is coupled to RFV 111, which in step 404 generates a voltage to be used for powering wireless key 100. At step 406, the receiver 108 in wireless key 100 receives UID 116 from the transponder on the mobile device. Controller 104 in the wireless key then compares UID 116 to UID 102 at step 408. If they don't match, controller 104 enters a wait state at step 418, awaiting the next transmission from a mobile device. If the two unique identifications match, at step 410 XMT 106 transmits UID 102 to RCV 122 in the wireless key, which receives it at step 412. In step 414, the controller 118 compares UID 102 with UID 116. If they match, controller 118 sends an authorization command to the mobile device 128, at step 416, after which the process repeats as shown. If they do not match, a wait occurs at step 420, after which the process repeats as shown. If no match is determined at step 414, a wait occurs at step 420, after which the process reverts to step 402 and repeats.

Figure 5:
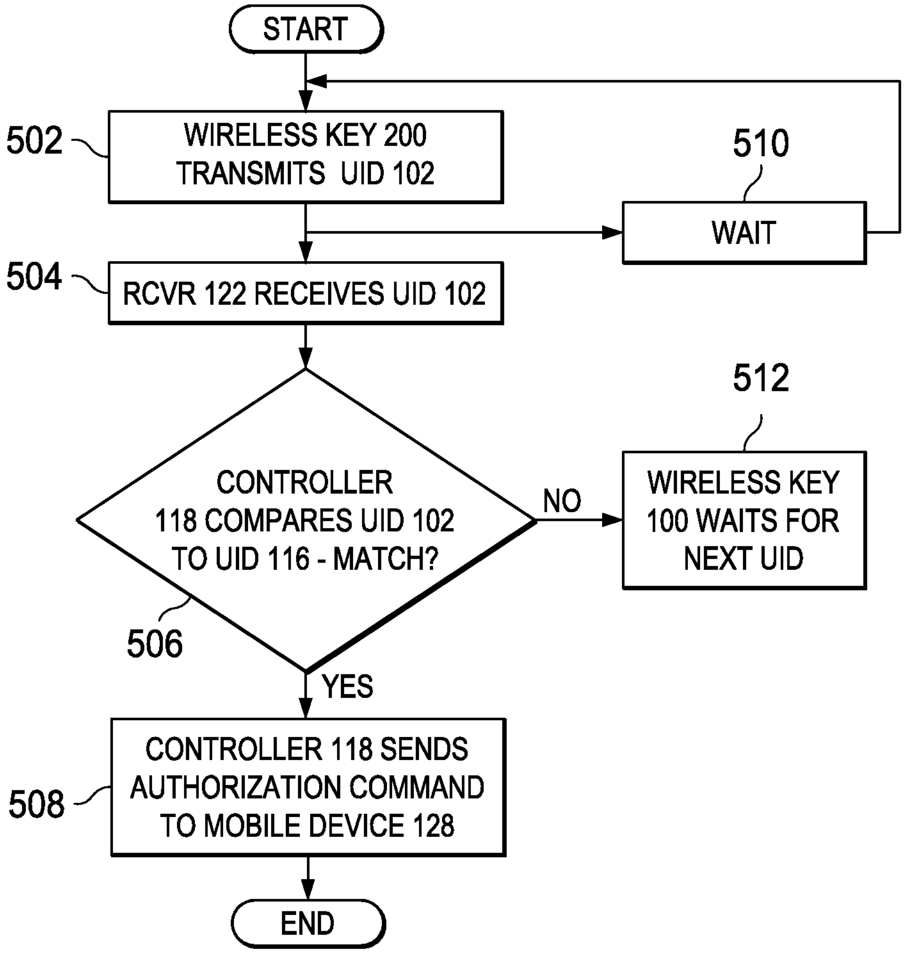
FIG. 5 is a flow diagram showing the method of operation of the system of FIG. 2.

In FIG. 5, a flow diagram illustrates operation of the system of FIG. 2. In this system, an active transmitter in the wireless key 200 transmits to an authorization receiver in the mobile device to be controlled. Operation starts at 502 when wireless key 200 transmits the UID 102 associated with the wireless key. After a time period set by wait at step 510, the wireless key repeats its transmission. At step 504, the receiver 122 in mobile device 202 receives UID 102 from the wireless key. At step 506, controller 118 in the mobile device 202 compares UID 102 to UID 116. If they don't match, controller 118 enters a wait state at step 512, awaiting the next transmission from a wireless key. If the two UID's match, at step 508 controller 118 sends an authorization command to the mobile device 128.

Those skilled in the art to which the invention relates will appreciate that yet other substitutions and modifications can be made to the described embodiments, without departing from the spirit and scope of the invention as described by the claims below.

What is claimed is:

1. A system for controlling operation of a mobile device and/or access to data on the mobile device, comprising:

an authorization transponder coupled to said mobile device, having a unique identification (UID), a transmitter for wirelessly transmitting said UID to a nearby device, a receiver able to receive a UID wirelessly transmitted from said nearby device, and a controller able to compare the authorization transponder UID with the UID transmitted by the nearby device, such that if a match is determined, operation of all or a subset of functions of said mobile device is enabled; and said nearby device, having a unique identification (UID), a receiver able to receive said UID from said authorization transponder, a controller able to compare the UID of said nearby device with the UID received from the authorization transponder, and a transmitter which transmits the UID of said nearby device to said authorization transponder if the UIDs match, said nearby device being a passive transponder, generating power for its operation from the received radio frequency energy transmitted by said authorization transponder coupled to the mobile device.

2. The system of claim 1, wherein said nearby device is a passive radio frequency identification (RFID) tag.

3. The apparatus of claim 1, wherein the authorization transponder further comprises:

a card reader able to read a UID from a card and couple said card UID to said controller on the authorization transponder.

4. The system of claim 1, wherein said nearby device is a wireless transponder.

5. The system of claim 4, wherein said wireless transponder is a passive radio frequency identification (RFID) tag.

6. The system of claim 1, wherein said authorization transponder is an active device with sufficient transmit power to provide a received signal strength at said nearby device to generate power for operation of said nearby device.

7. The system of claim 1, wherein:

an output of said authorization transponder transmitter is coupled to an input of a diplexer;

an input of said authorization transponder receiver is coupled to an output of said diplexer;

an input of said authorization transponder transmitter is coupled to an output of a controller;

an output of said authorization transponder receiver is coupled to an input of said controller; and an output of said controller is coupled to an input of said mobile device.

8. The system of claim 1, wherein:

an output of said nearby device transmitter is coupled to an input of a diplexer;

an input of said nearby device receiver is coupled to an output of said diplexer;

an input of said nearby device transmitter is coupled to an output of a controller; and an output of said nearby device receiver is coupled to an input of said controller.

9. An apparatus for controlling operation of a mobile device and/or access to data on the mobile device, comprising:

a receiver able to receive a unique identification (UID) wirelessly transmitted from an authorization transponder associated with said mobile device, a controller able to compare the received UID with a UID associated with the apparatus, and a transmitter which transmits the UID of said apparatus to said authorization transponder if the UIDs match, said apparatus being a passive transponder, generating power for its operation from the received radio frequency energy transmitted by said authorization transponder.

10. The apparatus of claim 9, wherein said authorization transponder is an active device with sufficient transmit power to provide a received signal strength at said nearby device to generate power for operation of said apparatus.

11. The apparatus of claim 9, wherein:

an output of said transmitter is coupled to an input of a diplexer;

an input of said receiver is coupled to an output of said diplexer;

an input of said transmitter is coupled to an output of a controller; and an output of said receiver is coupled to an input of said controller.

12. A method for authorizing operation of or access to data on a mobile device when in proximity to a nearby wireless transponder, comprising:

receiving in said nearby wireless transponder a unique identification (UID) wirelessly transmitted to said nearby wireless transponder by an authorization transponder associated with said mobile device, said nearby wireless transponder generating power for its operation from received radio frequency energy transmitted by said authorization transponder;

comparing in the nearby wireless transponder the authorization transponder UID received from the authorization transponder, a UID associated with the nearby wireless transponder; and if a match is found, transmitting an authorizing command from the nearby wireless transponder to the mobile device if the UIDs match.

13. The method of claim 12, wherein said authorization transponder is an active device with sufficient transmit power to provide a received signal strength at said nearby device to generate power for operation of said nearby wireless transponder.

14. The method of claim 12, wherein said nearby wireless transponder is a passive radio frequency identification (RFID) tag.

15. The method of claim 12, wherein:

an output of said authorization transponder transmitter is coupled to an input of a diplexer;

an input of said authorization transponder receiver is coupled to an output of said diplexer;

an input of said authorization transponder transmitter is coupled to an output of a controller;

an output of said authorization transponder receiver is coupled to an input of said controller; and an output of said controller is coupled to an input of said mobile device.

16. The method of claim 12, wherein:

an output of a transmitter in said nearby wireless transponder is coupled to an input of a diplexer;

an input of a receiver in said nearby wireless transponder is coupled to an output of said diplexer;

an input of said transmitter in said nearby wireless transponder is coupled to an output of a controller; and an output of said receiver in said nearby wireless transponder is coupled to an input of said controller.

17. A method for authorizing operation of or access to data on a mobile device when in proximity to a nearby wireless transponder, comprising:

transmitting periodically or occasionally from an authorization transponder associated with said mobile device a unique identifications (UID);

receiving in said authorization transponder a UID transmitted by a nearby wireless transponder enabled to generate power for its operation from received radio frequency energy transmitted to said nearby wireless transponder by said authorization transponder; and authorizing operation of or access to data on said mobile device if the UIDs match.

18. The method of claim 17, wherein said authorization transponder is an active device with sufficient transmit power to provide a received signal strength at said nearby device to generate power for operation of said nearby wireless transponder.

19. The method of claim 18, wherein said nearby wireless transponder is a passive radio frequency identification (RFID) tag.

20. The method of claim 17, wherein:

an output of a transmitter in said authorization transponder is coupled to an input of a diplexer;

an input of a receiver in said authorization transponder is coupled to an output of said diplexer;

an input of said transmitter in said authorization transponder is coupled to an output of a controller;

an output of said receiver in said authorization transponder is coupled to an input of said controller; and an output of said controller is coupled to an input of said mobile device.

21. The method of claim 17, wherein:

an output of a transmitter in said nearby wireless transponder is coupled to an input of a diplexer;

an input of a receiver in said nearby wireless transponder is coupled to an output of said diplexer;

an input of said transmitter in said nearby wireless transponder is coupled to an output of a controller; and an output of said receiver in said nearby wireless transponder is coupled to an input of said controller.

* * * * *